US009860394B2

United States Patent
Kanaya

(10) Patent No.: US 9,860,394 B2
(45) Date of Patent: Jan. 2, 2018

(54) IMAGE READING APPARATUS, CONTROL METHOD, AND COMPUTER-READABLE, NON-TRANSITORY MEDIUM

(71) Applicant: PFU LIMITED, Kahoku-shi, Ishikawa (JP)

(72) Inventor: Shingo Kanaya, Kahoku (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 15/178,139

(22) Filed: Jun. 9, 2016

(65) Prior Publication Data

US 2017/0257495 A1   Sep. 7, 2017

(30) Foreign Application Priority Data

Mar. 3, 2016   (JP) .................................. 2016-041177

(51) Int. Cl.
*H04N 1/04* (2006.01)
*H04N 1/00* (2006.01)
*H04N 1/028* (2006.01)

(52) U.S. Cl.
CPC ..... *H04N 1/00037* (2013.01); *H04N 1/00013* (2013.01); *H04N 1/0057* (2013.01);
(Continued)

(58) Field of Classification Search
CPC .......... H04N 1/00037; H04N 1/00013; H04N 1/00092; H04N 1/0057; H04N 1/00072; H04N 1/02815; H04N 2201/0081
(Continued)

(56) References Cited

U.S. PATENT DOCUMENTS 9,066,053 B1 *   6/2015   Hyoki .................. H04N 1/4097
2011/0188092 A1 *   8/2011   Fukutome ................ H04N 1/40
                                                                358/461
(Continued)

FOREIGN PATENT DOCUMENTS

JP    11-187271 A    7/1999
JP    2005-65033    3/2005
(Continued)

OTHER PUBLICATIONS

Office action dated Oct. 25, 2016 in corresponding JP Patent Application No. 2016-41177, including Eng. translation 6pp.
(Continued)

*Primary Examiner* — Cheukfan Lee
(74) *Attorney, Agent, or Firm* — Lewis Roca Rothgerber Christie LLP

(57) ABSTRACT

An image reading apparatus includes an image capturing module, a reference member, a light source for emitting light to the reference member, a foreign object determining module for determining whether or not a foreign object appears in a specific image, and a position determining module for determining whether the foreign object exists on the image capturing module side or on the reference member side, based on an absolute value of a difference between a gradation value in a region included in two images and corresponding to a region where the foreign object appears when the foreign object appears in the specific image. One image is an image of the reference member captured under illumination of light with a first light quantity from the light source, and other image is an image of the reference member captured under illumination of light with a second light quantity from the light source.

8 Claims, 13 Drawing Sheets

(52) U.S. Cl.
CPC ..... *H04N 1/00092* (2013.01); *H04N 1/00702* (2013.01); *H04N 1/02815* (2013.01); *H04N 2201/0081* (2013.01)

(58) Field of Classification Search
USPC .......................................................... 358/35
See application file for complete search history.

(56) References Cited

U.S. PATENT DOCUMENTS

| | | |
|---|---|---|
| 2014/0078558 A1 | 3/2014 | Kanaya |
| 2014/0079460 A1* | 3/2014 | Kanaya ............. H04N 1/00615 400/583 |
| 2014/0268256 A1* | 9/2014 | Mayama ................ H04N 1/024 358/496 |
| 2015/0022868 A1 | 1/2015 | Shimizu |

FOREIGN PATENT DOCUMENTS

| | | |
|---|---|---|
| JP | 2010-10867 | 1/2010 |
| JP | 2011-87213 A | 4/2011 |
| JP | 2011-259164 A | 12/2011 |
| JP | 2012-204972 A | 10/2012 |
| JP | 2015-23379 A | 2/2015 |

OTHER PUBLICATIONS

International Search Report for corresponding International Application PCT/JP2016/056656 dated Apr. 5, 2016 including translation of documents considered relevant, 6pp.

Written Opinion for corresponding International Application PCT/JP2016/056656 dated Apr. 5, 2016 including partial English translation, 6pp.

International Search Report and Written Opinion for corresponding International Application PCT/JP2016/073670, dated Oct. 18, 2016, including partial English translations thereof, 18pp.

* cited by examiner

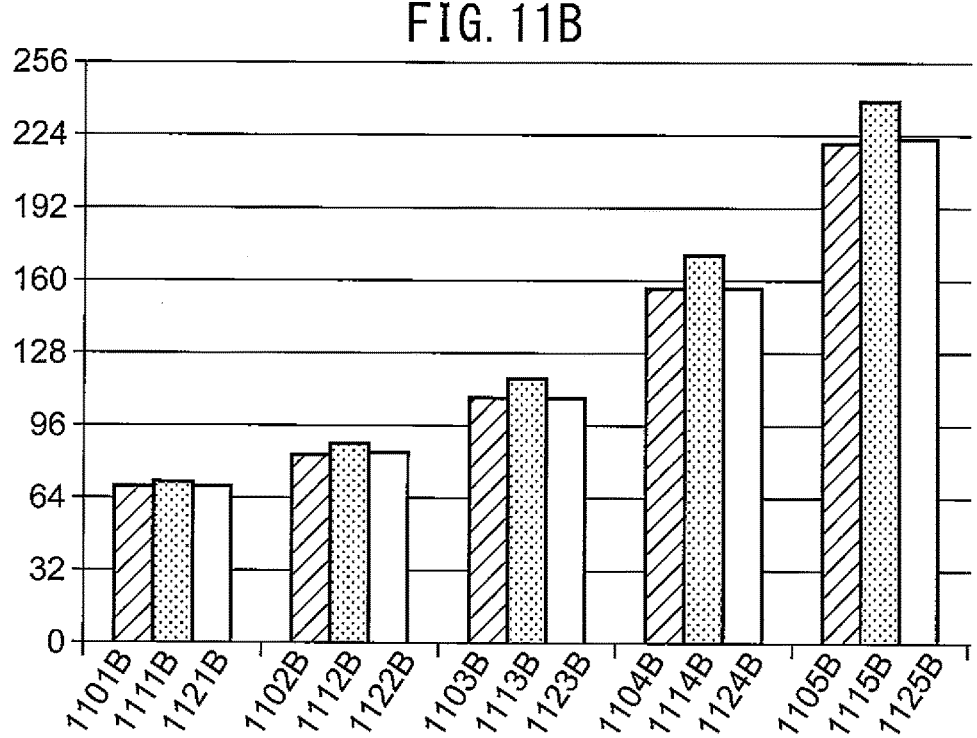
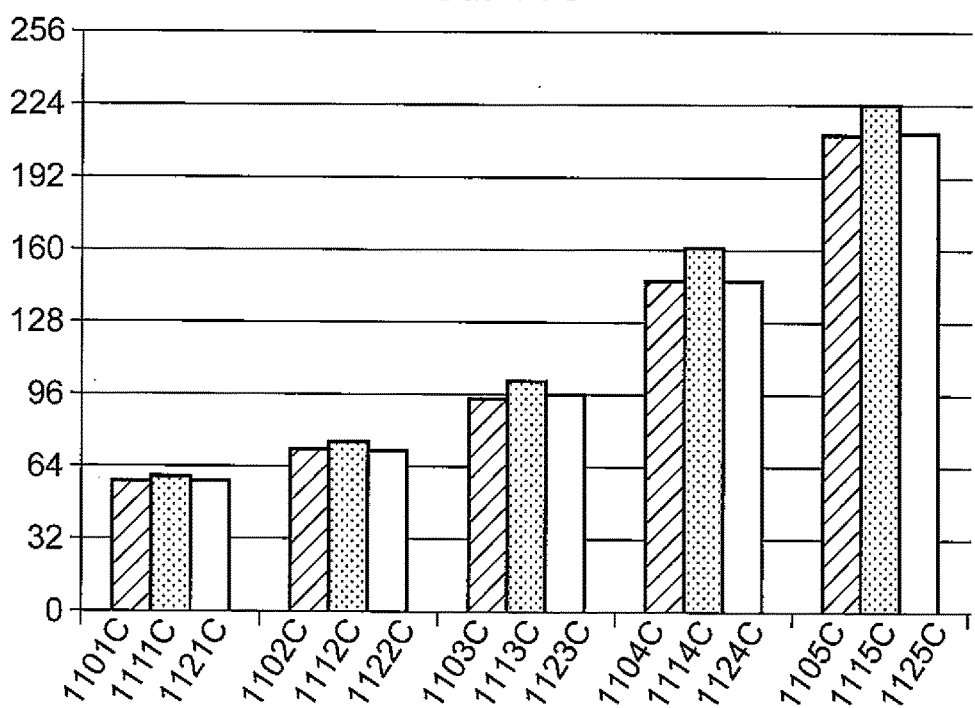

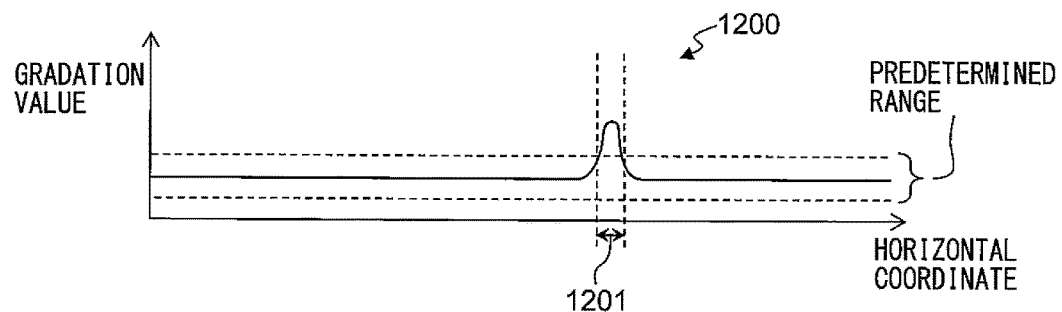
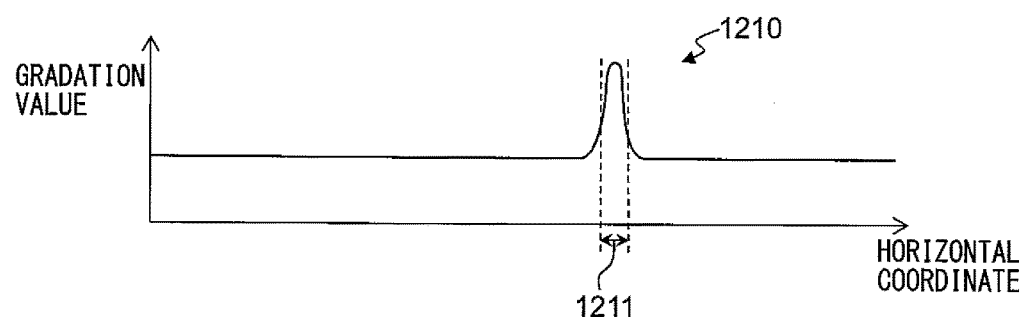
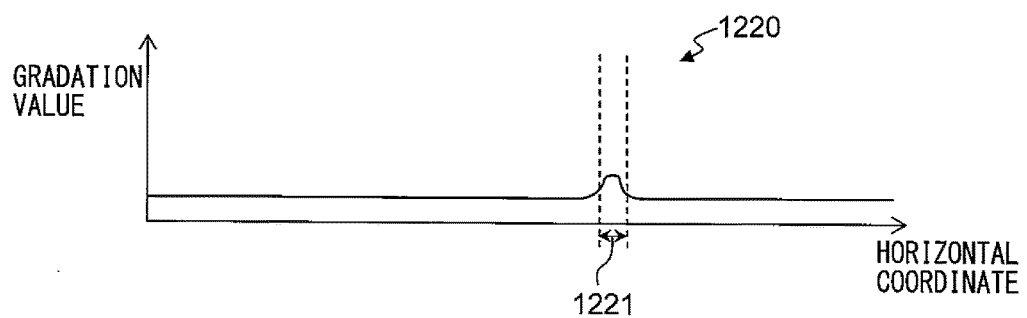

IMAGE READING APPARATUS, CONTROL METHOD, AND COMPUTER-READABLE, NON-TRANSITORY MEDIUM

CROSS-REFERENCE TO RELATED APPLICATIONS

This application is based upon and claims the benefit of priority of prior Japanese Patent Application No. 2016-041177, filed on Mar. 3, 2016, the entire contents of which are incorporated herein by reference.

TECHNICAL FIELD

Embodiments illustrated herein relate to detecting a foreign object appearing in an image.

BACKGROUND

Typically, while transferring a document, an image reading apparatus such as a scanner captures an image of the document, using an image capturing device such as a line sensor with imaging elements arranged one-dimensionally. For this reason, a foreign object such as paper powder, dust and paste, etc., attached to a glass surface of the image capturing device may cause vertical stripe noise to appear on a document image obtained by capturing the document.

An image reading apparatus which compares reading data acquired by two CISs arranged to face each other via a transfer path, determines a position where dust attaches, and notifies a user of the determined result is disclosed (refer to Japanese Laid-open Patent Publication No. 2012-204972).

SUMMARY

It is necessary for an image reading apparatus to appropriately correct a document image such that vertical stripe noise does not appear in the document image. Typically, various characters, pictures, illustration patterns, or the like have been printed on a document, making it difficult to correctly determine whether or not a foreign object appears in the document image. On the other hand, using a captured image of a plain reference plate arranged at a position facing an image capturing device and that has been acquired when a document is not transferred makes it possible to accurately determine whether or not a foreign object appears in the document image. When a foreign object appears in the captured image of the reference plate, it is however difficult to correctly determine whether the foreign object exists on an image capturing device side or on a reference plate side. Whether or not vertical stripe noise appears in a document image depends on a position of a foreign object. For this reason, accurate determination of a position of a foreign object is demanded for appropriately correcting a document image.

An object of image reading apparatus, control method, and a computer-readable, non-transitory medium storing a computer program is to accurately determine a position of a foreign object.

According to an aspect of the device, there is provided an image reading apparatus. The image reading apparatus includes an image capturing module for capturing a first image and a second image, a reference member provided at a position facing the image capturing module, a light source for emitting light to the reference member, a foreign object determining module for determining whether or not a foreign object appears in a specific image captured by the image capturing module, and a position determining module for determining whether the foreign object exists on the image capturing module side or on the reference member side, based on an absolute value of a difference between a gradation value in a region included in the first image and corresponding to a region where the foreign object appears and a gradation value in a region included in the second image and corresponding to the region where the foreign object appears when the foreign object appears in the specific image. The first image is an image of the reference member captured under illumination of light with a first light quantity from the light source, and the second image is an image of the reference member captured under illumination of light with a second light quantity from the light source, the second light quantity being different from the first light quantity.

According to an aspect of the method, there is provided a control method of an image reading apparatus including an image capturing module for capturing a first image and a second image, a reference member provided at a position facing the image capturing module, and a light source that for emitting light to the reference member. The control method includes determining whether or not a foreign object appears in a specific image captured by the image capturing module, and determining whether the foreign object exists on the image capturing module side or on the reference member side, based on an absolute value of a difference between a gradation value in a region included in the first image and corresponding to a region where the foreign object appears and a gradation value in a region included in the second image and corresponding to the region where the foreign object appears when the foreign object appears in the specific image. The first image is an image of the reference member captured under illumination of light with a first light quantity from the light source, and the second image is an image of the reference member captured under illumination of light with a second light quantity from the light source, the second light quantity being different from the first light quantity.

According to an aspect of the computer-readable, non-transitory medium storing a computer program, the computer program causes an image reading apparatus including an image capturing module for capturing a first image and a second image, a reference member provided at a position facing the image capturing module, and a light source for emitting light to the reference member to execute a process. The process includes determining whether or not a foreign object appears in a specific image captured by the image capturing module, and determining whether the foreign object exists on the image capturing module side or on the reference member side, based on an absolute value of a difference between a gradation value in a region included in the first image and corresponding to a region where the foreign object appears and a gradation value in a region included in the second image and corresponding to the region where the foreign object appears when the foreign object appears in the specific image. The first image is an image of the reference member captured under illumination of light with a first light quantity from the light source, and the second image is an image of the reference member captured under illumination of light with a second light quantity from the light source, the second light quantity being different from the first light quantity.

The object and advantages of the invention will be realized and attained by means of the elements and combinations particularly pointed out in the claims. It is to be understood that both the foregoing general description and the following detailed description are exemplary and explanatory, and are not restrictive of the invention, as claimed.

BRIEF DESCRIPTION OF THE DRAWINGS

FIG. 4 is a diagram illustrating a first imaging unit 130a and the like.

FIG. 11B is a graph expressing a relation between a light quantity of light radiated from a light source and a gradation value.

FIG. 11C is a graph expressing a relation between a light quantity of light radiated from a light source and a gradation value.

FIG. 12A is a graph for illustrating a reference image.
FIG. 12B is a graph for illustrating a first image.
FIG. 12C is a graph for illustrating a second image.

EMBODIMENTS OF THE INVENTION

Hereinafter, a document conveying apparatus according to an embodiment, will be described with reference to the drawings. However, it should be noted that the technical scope of the invention is not limited to these embodiments, and extends to the inventions described in the claims and their equivalents.

Figure 1:
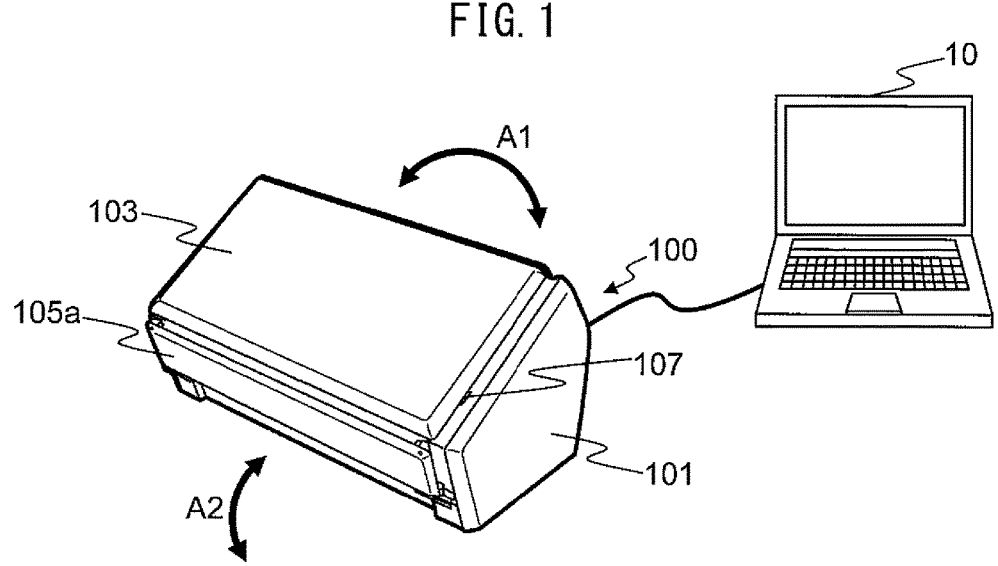
FIG. 1 is a configuration diagram of one example of an image processing system according to an embodiment.

FIG. 1 illustrates a configuration diagram of one example of the image processing system according to an embodiment.

The image reading apparatus of a present embodied example is configured as an image reading apparatus 100 such as an image scanner. The image processing system 1 includes the image reading apparatus 100 and an information processing apparatus 10. In FIG. 1, the image reading apparatus 100 is depicted by a perspective illustration.

The image reading apparatus 100 includes a lower housing 101, an upper housing 102, a document tray 103, a front surface cover 105a, an opening/closing detector 107, and the like. The image reading apparatus 100 is connected to the information processing apparatus 10. The image processing apparatus 10 is a personal computer, or a personal digital assistant, for example.

Figure 2:
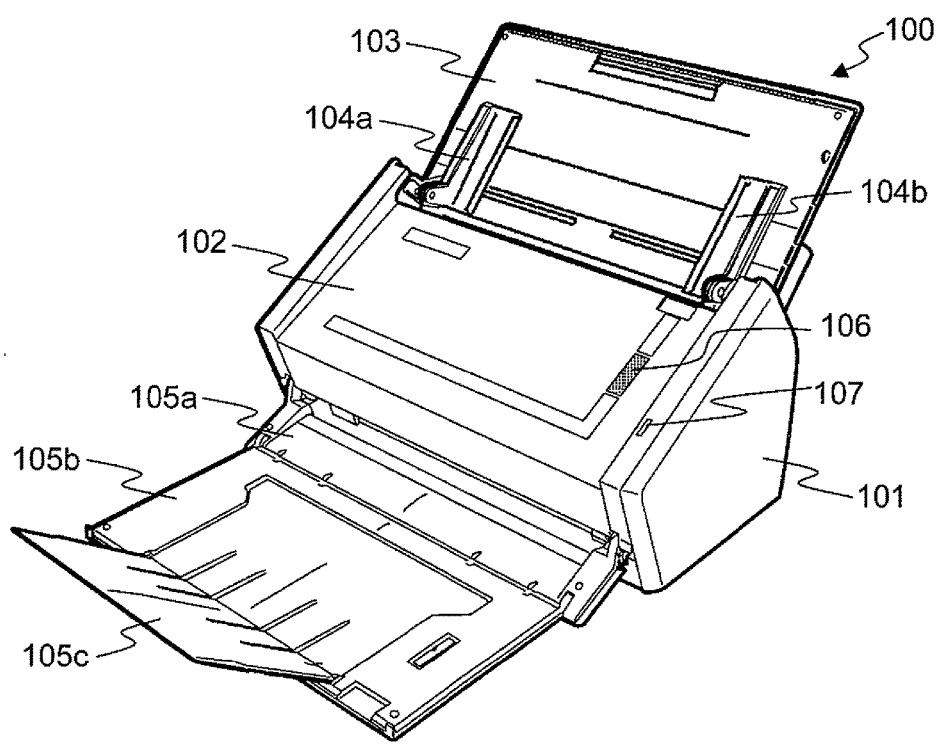
FIG. 2 is a perspective view of an image reading apparatus 100 to which a document tray 103 has been set.

FIG. 2 is a perspective view of the image reading apparatus 100 where the document tray 103 is set.

The image reading apparatus 100 includes an upper surface cover 105b, an auxiliary cover 105c, and operation button 106. The document tray 103 engages the lower housing 101 by hinges so as to be rotated in the direction indicated by the arrow A1. In a state of FIG. 1, the document tray 103 is arranged at a position where the document tray 103 covers the upper housing 102, the upper surface cover 105b, and the auxiliary cover 105c. Thus, the document tray 103 functions as an exterior cover.

On the other hand, in the state as depicted in FIG. 2, the document tray 103 is arranged such that documents can be placed on the document tray 103. Provided in the document tray 103 are side guides 104a and 104b that are movable in the right and left directions of the conveyance direction of a document. The side guides 104a and 104b are aligned with a width of a document to restrict the document in the width direction of the document.

The front surface cover 105a engages the lower housing 101 by hinges so as to be rotated in the direction indicated by the arrow A2. The upper surface cover 105b is connected at one end to the front surface cover 105a, and is connected at the other end to the auxiliary cover 105c. When it is necessary, the auxiliary cover 105c is let out from the upper surface cover 105b to hold a document.

The operation button 106 is arranged on the surface of the upper housing 102, which button generates and outputs an operation detection signal by pressing down. The opening/closing detector 107 includes a contact detecting sensor arranged at a position that faces the document tray 103 in a closed state, and detects an opened state and a closed state of the document tray 103. The opening/closing detector 107 generates and outputs an opening/closing detection signal of which signal value changes by the state of the document tray 103 whether it is open or closed.

Figure 3:
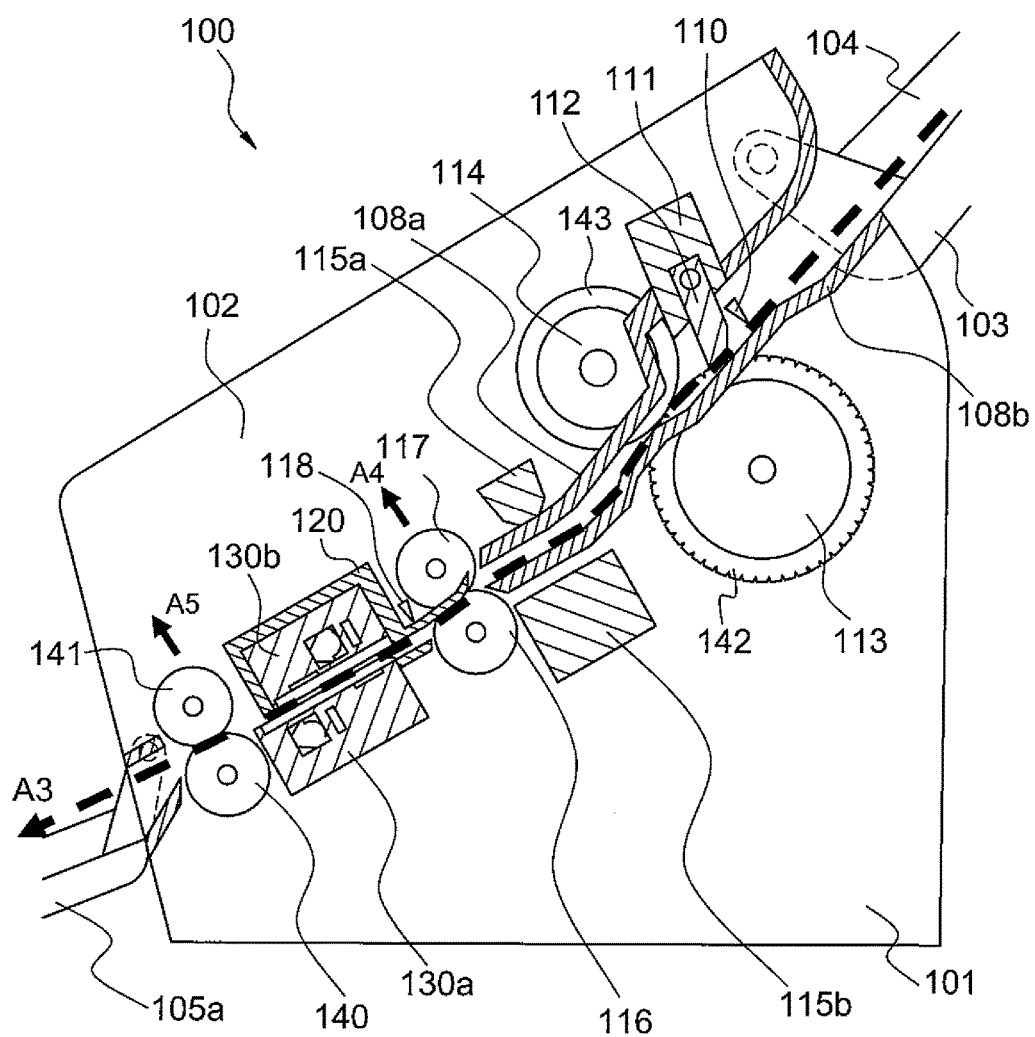
FIG. 3 is a diagram illustrating a transfer path inside the image reading apparatus 100.

FIG. 3 illustrates a conveyance path inside the image reading apparatus 100. The image reading apparatus 100 includes a first sensor 110, a pick arm 111, a flap 112, a sheet feeding roller 113, a retard roller 114, an ultrasonic wave transmitter 115a, an ultrasonic wave receiver 115b, a first conveyance roller 116, and a first driven roller 117. The image reading apparatus 100 includes a second sensor 118, an imaging unit guide 120, a first imaging unit 130a, a second imaging unit 130b, a second conveyance roller 140, a second driven roller 141, and the like.

A lower surface of the upper housing 102 forms an upper guide 108a of the document conveyance path, and an upper surface of the lower housing 101 forms a lower guide 108b of the document conveyance path. In FIG. 3, the arrow A3 indicates the conveyance direction of a document. In the following, the term "upstream" means "upstream in the conveyance direction A3", and the term "downstream" means "downstream in the conveyance direction A3".

The first sensor 110 is a contact detecting sensor, and is arranged in the upstream side of the pick arm 111, and detects whether or not a document is placed on the document tray 103. The first sensor 110 generates and outputs a first document detection signal of which signal value changes by the state whether or not a document is placed on the document tray 103.

The sheet feeding roller 113 is supported by a main body unit of the image reading apparatus 100 in a rotation-free manner. Provided in an outer circumferential surface of the sheet feeding roller 113 is a contact material 142 that contacts a document placed on the document tray 103. The contact material 142 is made of rubber, for example, of which coefficient of friction with a document is large.

The retard roller 114 is arranged to face the sheet feeding roller 113, and restricts so that a document that does not contact the sheet feeding roller 113 is not conveyed in the conveyance direction A3. The retard roller 114 is supported by the main body unit of the image reading apparatus 100 in a rotation-free manner. Provided in an outer circumferential surface of the retard roller 114 is a contact material 143 that contacts a document placed on the document tray 103. The contact material 143 is made of rubber, for example, of which coefficient of friction with a document is large.

The ultrasonic wave transmitter 115*a* and the ultrasonic wave receiver 115*b* are arranged near the document conveyance path so as to sandwich the conveyance path and face each other. The ultrasonic wave transmitter 115*a* transmits an ultrasonic wave. On the other hand, the ultrasonic wave receiver 115*b* detects an ultrasonic wave that has been transmitted by the ultrasonic wave transmitter 115*a* and has penetrated a document, and generates and outputs an ultrasonic wave signal that is an electrical signal depending on the detected ultrasonic wave. In the following, the ultrasonic wave transmitter 115*a* and the ultrasonic wave receiver 115*b* may be collectively referred to as an ultrasonic sensor 115.

The first conveyance roller 116 and the first driven roller 117 are respectively supported by the main body unit of the image reading apparatus 100 in a rotation-free manner. The first conveyance roller 116 and the first driven roller 117 are arranged on the upstream side of the first imaging unit 130*a* and the second imaging unit 130*b*. The first driven roller 117 is arranged above the first conveyance roller 116 to face the first conveyance roller 116. The first conveyance roller 116 is fixed, and the first driven roller 117 is arranged so as to be movable upward (in the direction of the arrow A4) relative to the first conveyance roller 116.

The second conveyance roller 140 and the second driven roller 141 are respectively supported by the main body unit of the image reading apparatus 100 in a rotation-free manner. The second conveyance roller 140 and the second driven roller 141 are arranged on the downstream side of an imaging unit 130. The second driven roller 141 is arranged above the second conveyance roller 140 to face the second conveyance roller 140. The second conveyance roller 140 is fixed, and the second driven roller 141 is arranged so as to be movable upward (in the direction of the arrow A5) relative to the second conveyance roller 140.

Figure 4:
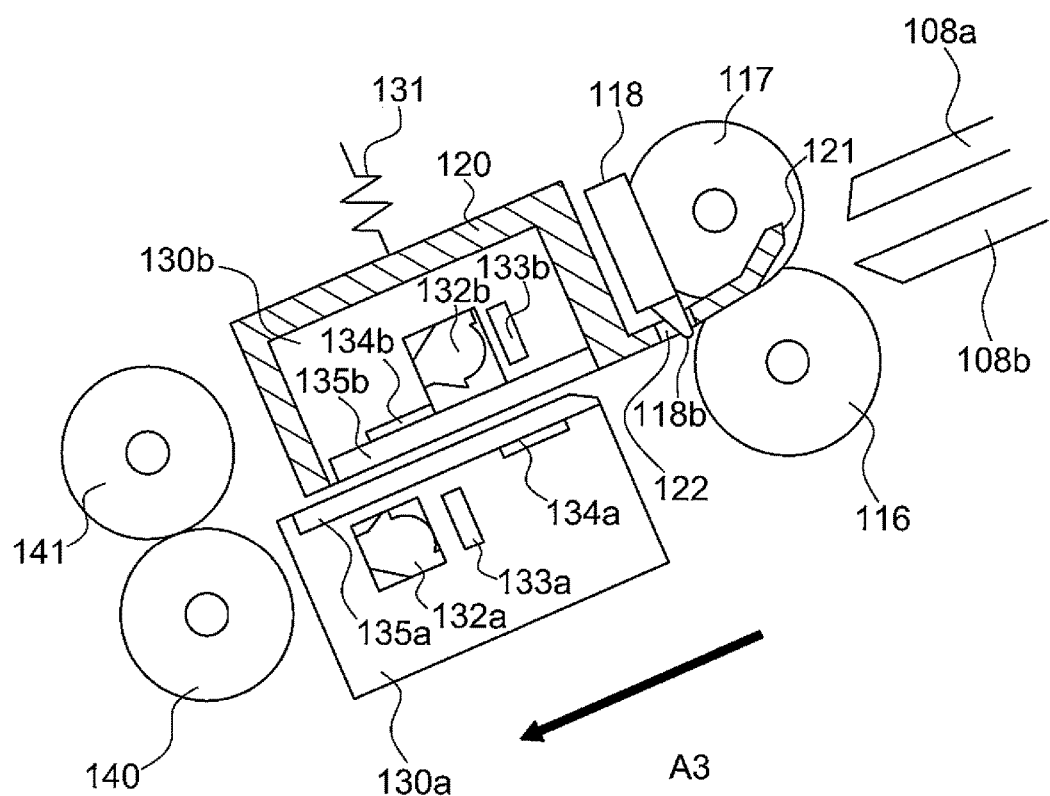

FIG. 4 illustrates the first imaging unit 130*a*, the second imaging unit 130*b*, and the imaging unit guide 120. The first imaging unit 130*a* captures an image of a front surface of a conveyed document, and the second imaging unit 130*b* captures an image of a back surface of the conveyed document. The second imaging unit 130*b* is arranged above the first imaging unit 130*a* to face the first imaging unit 130*a*. The second imaging unit 130*b* includes the imaging unit guide 120 for guiding a document between the first imaging unit 130*a* and the second imaging unit 130*b*. In the following, the first imaging unit 130*a* and the second imaging unit 130*b* may be collectively referred to as the imaging unit 130.

The first imaging unit 130*a* is fixed to the lower housing 101. On the other hand, the second imaging unit 130*b* is supported by the upper housing 102 so as to be movable in the direction perpendicular to the conveyance path. The second imaging unit 130*b* includes a pushing spring 131 at an upper position thereof. The pushing spring 131 pushes the second imaging unit 130*b* toward the first imaging unit 130*a*. When there is no document at the conveyance path, pushing force of the pushing spring 131 returns the second imaging unit 130*b* back to an initial position. In other words, the second imaging unit 130*b* is provided to be able to move between an initial position facing the first imaging unit 130*a* and a position facing the first imaging unit 130*a* and more separated from the first imaging unit 130*a* than the initial position.

When the second imaging unit 130*b* is at the initial position, a width of a gap between the first imaging unit 130*a* and the second imaging unit 130*b* facing each other is larger than the thicknesses of a copy paper sheet, a print paper sheet, a photo paper sheet, and the like. For this reason, the second imaging unit 130*b* does not move from the initial position after any of these sheets are conveyed.

The first imaging unit 130*a* includes a first light source 132*a*, a first image capturing device 133*a*, a first reference member 134*a*, a first glass surface 135*a*, and the like. The second imaging unit 130*b* includes a second light source 132*b*, a second image capturing device 133*b*, a second reference member 134*b*, a second glass surface 135*b*, and the like. In the following, the first image capturing device 133*a* and the second image capturing device 133*b* may be collectively referred to as an image capturing device 133. The first reference member 134*a* and the second reference member 134*b* may be collectively referred to as a reference member 134.

The first light source 132*a* includes light emitting diodes (LEDs) of respective colors RGB and a light guiding material, and emits an illuminating light to a document surface. When there is no document at an illuminating position, the second reference member 134*b* of the second imaging unit 130*b* is irradiated with illuminating light. Similarly, the second light source 132*b* includes LEDs of respective colors RGB and a light guiding material, and emits an illuminating light to a document surface. When there is no document at an illuminating position, the first reference member 134*a* of the first imaging unit 130*a* is irradiated with illuminating light.

The first image capturing device 133*a* and the second image capturing device 133*b* are an example of an image capturing module. The first image capturing device 133*a* includes a contact image sensor (CIS) that is a unit-magnification optical system that includes an imaging element constituted by charge coupled devices (CCDs) that are linearly arranged in a main scanning direction. The first image capturing device 133*a* reads a front surface of a document to generate and output an image signal. The second image capturing device 133*b* includes a CIS that is a unit-magnification optical system that includes an imaging element constituted by CCDs that are linearly arranged in a main scanning direction. Alternatively, instead of the CCDs, complementary metal oxide semiconductors (CMOSs) may be used. Further, alternatively, instead of the CIS, an image sensor that is an optical reduction system can be used.

The first reference member 134*a* is a white reference plate, and is arranged at a position facing the second image capturing device 133*b*. When a document is not conveyed to the imaging unit 130, the second image capturing device 133*b* captures an image of the first reference member 134*a* to generate an image signal. Similarly, the second reference member 134*b* is arranged at a position facing the first image capturing device 133*a* of the first imaging unit 130*a*. When a document is not conveyed to the imaging unit 130, the first image capturing device 133*a* captures an image of the second reference member 134*b* to generate an image signal.

On the basis of the image signals generated by capturing the images of the first reference member 134a and the second reference member 134b, the image reading apparatus 100 can perform image correction such as shading, and the like.

Provided at the imaging unit guide 120 is a guide member 121 that guides a document to a position between the first imaging unit 130a and the second imaging unit 130b. The second sensor 118 is provided above the guide member 121. A lever unit 118b of the second sensor 118 penetrates a penetration hole 122 provided in the guide member 121 to contact a document on the conveyance path.

Either the first imaging unit 130a or the second imaging unit 130b may be omitted. In this case, in place of the omitted image capturing module, a transfer roller functioning as the reference member may be provided.

Figure 5:
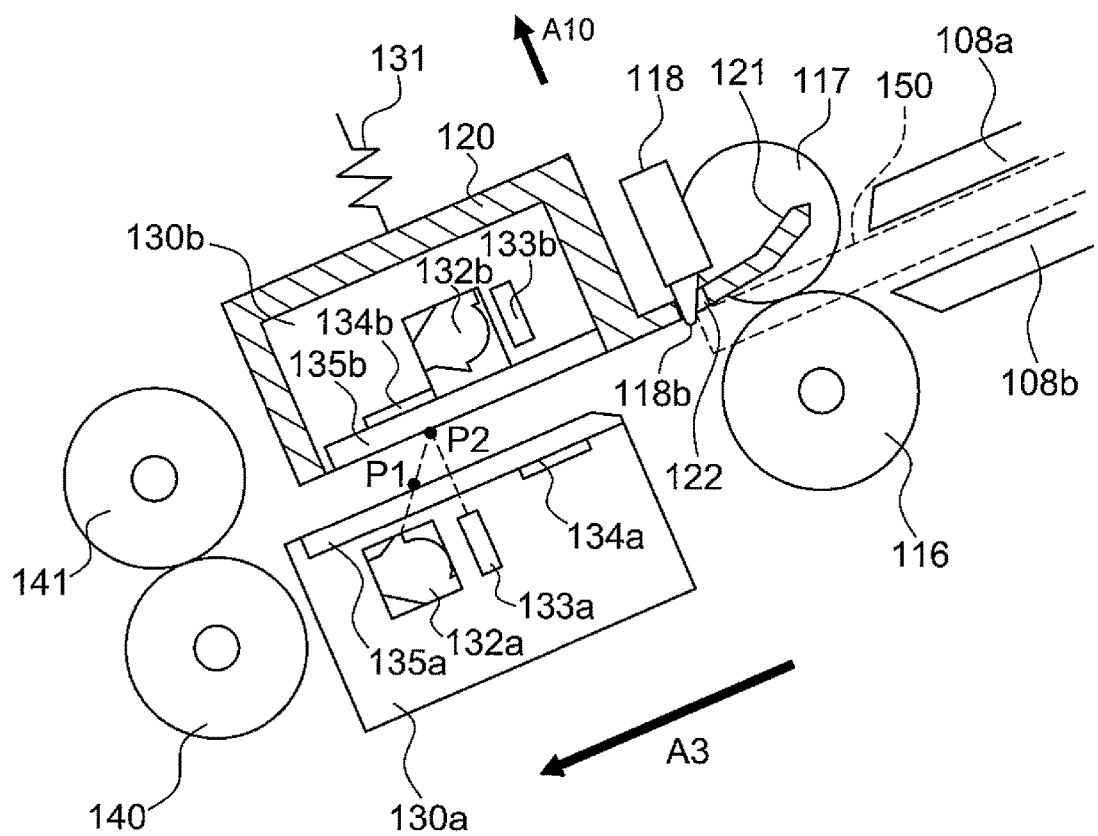
FIG. 5 is a diagram illustrating an operation of a second imaging unit 130b.

FIG. 5 illustrates an operation of the second imaging unit 130b at the time of conveying a document. In an example shown in FIG. 5, it is assumed that a thick medium such as a cardboard, a banking card, and a credit card is conveyed as a document 150. A thickness of the medium is larger than thicknesses of a copy paper sheet, a print paper sheet, and a photo paper sheet.

When a document 150 that is a thick medium is conveyed to a position of the imaging unit guide 120, the document 150 having a certain degree of strength contacts the guide member 121, and the imaging unit guide 120 and the second imaging unit 130b move in the direction of the arrow A10, separating from the conveyance path. On the other hand, even when a document 150 that is a thin medium such as a copy paper sheet, a print paper sheet, and a photo paper sheet is conveyed to the imaging unit guide 120, the second imaging unit 130b does not moved from the initial position.

A document 150 that contacted the guide member 121 then contacts the lever unit 118b of the second sensor 118 that penetrates the penetration hole 122 of the guide member 121. Thereby, the second sensor 118 detects that the document 150 exists at a position of the lever unit 118b. The second sensor 118 generates and outputs a second document detection signal that has a first value in a state where the lever unit 118b does not contact a document 150, and that has a second value in a state where the lever unit 118b contacts a document 150.

The above-described embodied example is configured such that the second imaging unit 130b provided above the transfer path moves, but modification may be made such that the first imaging unit 130a provided below the transfer path moves.

Figure 6:
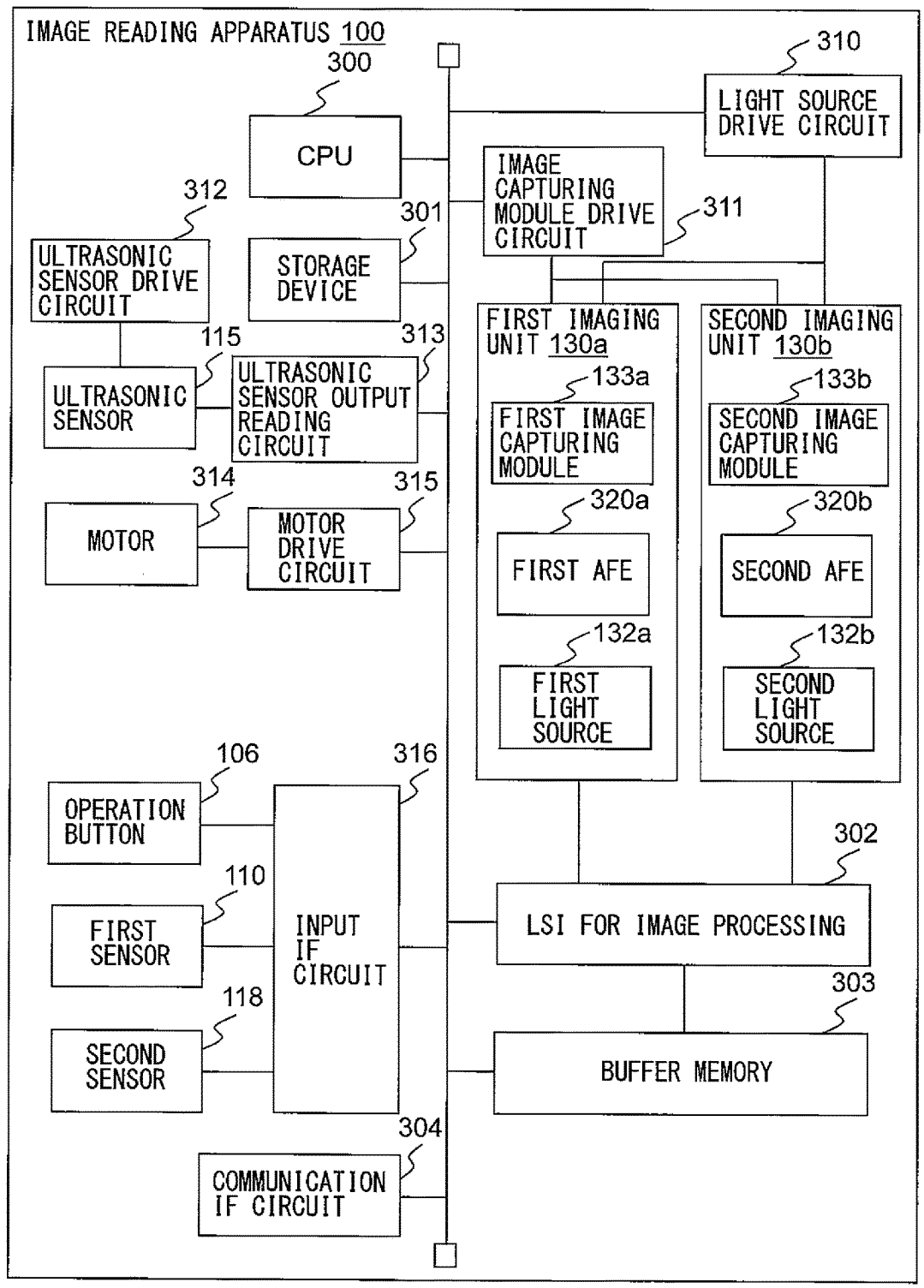
FIG. 6 is a diagram illustrating one example of a hardware configuration of the image reading apparatus 100.

FIG. 6 illustrates one example of a hardware configuration of the image reading apparatus 100. The image reading apparatus 100 includes a central processing unit (CPU) 300, a storage device 301, a large scale integration (LSI) 302 for image processing, a buffer memory 303, and a communication interface circuit 304 as well as the above-described configuration. In the attached drawings and the following description, an interface may be referred to as an IF.

Moreover, the image reading apparatus 100 includes a light source drive circuit 310, an image capturing module drive circuit 311, an ultrasonic sensor drive circuit 312, an ultrasonic sensor output reading circuit 313, a motor 314, a motor drive circuit 315, and an input IF circuit 316. The first imaging unit 130a and the second imaging unit 130b include a first analogue front-end processor (AFE) 320a and a second AFE 320b, respectively.

The CPU 300 controls an operation of the image reading apparatus 100 in accordance with a computer program stored in the memory 301. Furthermore, the CPU 300 may perform a part of or all of image processing for an image read by the image reading apparatus 100. Alternatively, a DSP (digital signal processor), an LSI (large scale integration), etc., may be used instead of the CPU 150. As another alternative, an ASIC (Application Specific Integrated Circuit), an FPGA (Field-Programming Gate Array), etc., may be used instead of the CPU 300.

The storage device 301 includes memory devices such as a RAM (Random Access Memory), a ROM (Read Only Memory), etc., a fixed disk device such as a hard disk, or a portable storage device such as a flexible disk, an optical disk, etc. The storage device 301 stores computer programs, databases, tables, etc., used for various kinds of processing of the image reading apparatus 100. The computer program may be installed on the storage device 301 from a computer-readable, non-transitory medium such as a compact disk read only memory (CD-ROM), a digital versatile disk read only memory (DVD-ROM), or the like by using a well-known setup program or the like. Further, the storage device 301 stores the read images.

The first AFE 320a and the second AFE 320b convert analogue image signals into digital signals to generate digital image data, the analogue image signals being output from the first image capturing device 133a of the first imaging unit 130a and the second image capturing device 133b of the second imaging unit 130b. The first AFE 320a and the second AFE 320b output the image data to the LSI 320 for image processing.

The LSI 302 for image processing performs predetermined image processing on the image data received from the imaging unit 130. The LSI 302 for image processing stores such image data in the buffer memory 303 as the image processing is performed. Alternatively, a DSP, an ASIC, or an FPGA, etc., may be used instead of the LSI 302 for image processing.

The communication IF circuit 304 is a wired or wireless communication interface between the image reading apparatus 100 and the information processing apparatus 10. The CPU 300 reads the image date from the buffer memory 303 to transmit the image data to the information processing apparatus 10 via the communication IF circuit 304.

The light source drive circuit 310 drives the first light source 132a of the first imaging unit 130a and the second light source 132b of the second imaging unit 130b in accordance with the control performed by the CPU 300. The image sensor drive circuit 311 drives the first image capturing device 133a of the first imaging unit 130a and the second image capturing device 133b of the second imaging unit 130b in accordance with the control performed by the CPU 300.

The ultrasonic sensor drive circuit 312 drives the ultrasonic wave transmitter 115a to cause the ultrasonic wave to be transmitted. The ultrasonic sensor output reading circuit 313 reads an output signal of the ultrasonic wave receiver 115b to transmit the output signal to the CPU 300 via a bus.

The motor 314 gives rotational driving force to the sheet feeding roller 113, the retard roller 114, the first conveyance roller 116, and the second conveyance roller 140. A plurality of the motors 314 may be provided. In accordance with the control performed by the CPU 300, the motor drive circuit 315 generates a drive current that is supplied to the motor 314.

The input IF circuit 316 receives an operation detection signal output by the operation button 106, a first document detection signal output by the first sensor 110, and a second document detection signal output by the second sensor 118 to transmit the signals to the CPU 300 via the bus.

The hardware configuration illustrated in FIG. 6 is merely an example for explanation of the embodied example. The image reading apparatus 100 may include any other hardware configurations as long as the operation described in the following may be performed.

Figure 7:
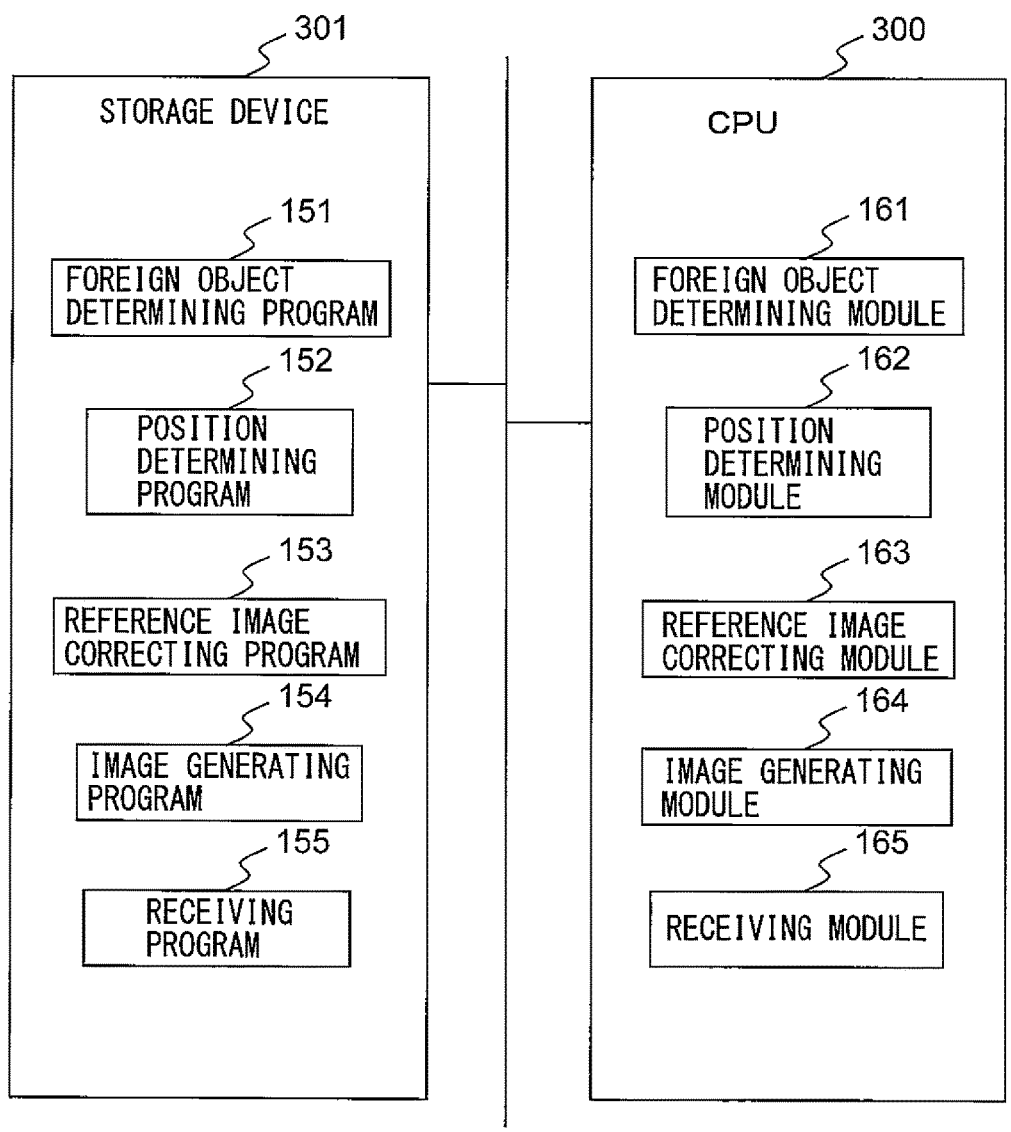
FIG. 7 is a diagram representing a schematic configuration of a storage device 301 and a CPU 300.

FIG. 7 is a diagram illustrating a schematic configuration of the storage device 301 and the CPU 300.

As illustrated in FIG. 7, the storage device 301 stores programs including a foreign object determining program 151, a position determining program 152, a reference image correcting program 153, an image generating program 154, and a receiving program 155. Each of these programs is a function module implemented by software operating on a processor. The CPU 300 reads the respective programs stored in the storage device 301, and operates in accordance with the respective read programs to thereby function as a foreign object determining module 161, a position determining module 162, a reference image correcting module 163, an image generating module 164, and a receiving module 165.

Figure 8:
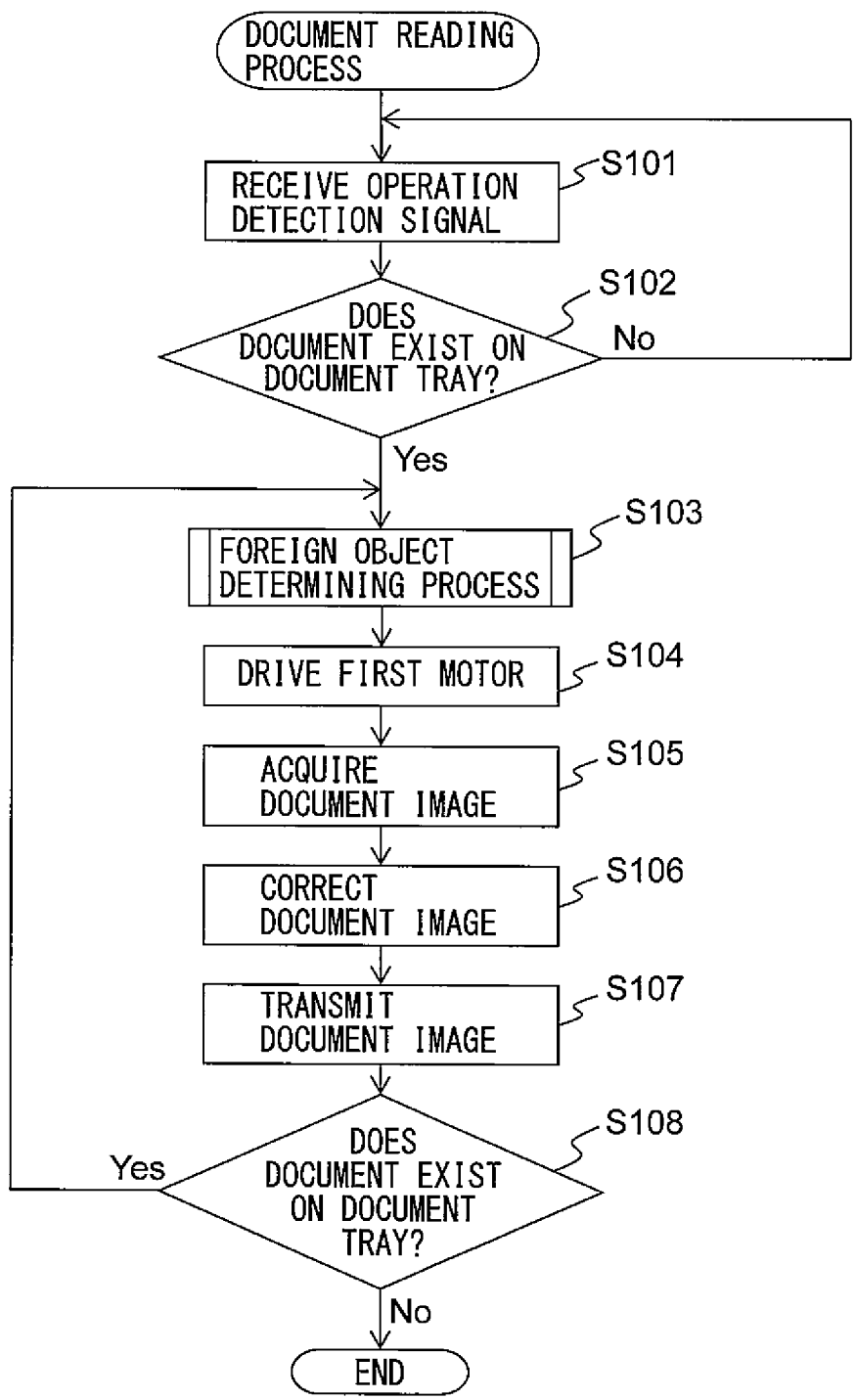
FIG. 8 is a flowchart representing an operational example of a document reading process.

FIG. 8 is a flowchart representing an operational example of a document reading process of the image reading apparatus 100.

Referring to the flowchart of FIG. 8, the following describes the operational example of the document reading process of the image reading apparatus 100. The flow of the operation described below is performed mainly by the CPU 300 based on the programs previously stored in the storage device 301, cooperating with the respective elements of the image reading apparatus 100.

First, the CPU 300 waits until a user presses down the operation button 106 for commanding reading of a document, and the CPU 300 receives from the operation button 106 an operation detection signal that commands reading of a document (step S101).

Next, the CPU 300 determines whether or not a document is placed on the document tray 103, based on a first document detection signal received from the first sensor 110 (step S102).

When a document is not placed on the document tray 103, the CPU 300 returns the process to the step S101, and waits until the CPU 300 receives the operation detection signal from the operation button 106 again.

On the other hand, when a document is placed on the document tray 103, the CPU 300 executes the foreign object determining process (step S103). In the foreign object determining process, the foreign object determining module 161 determines whether or not a foreign object appears in an image. When a foreign object appears in the image, the position determining module 162 compares gradation values of two captured images of the reference member illuminated with light of different light quantities, to thereby determine whether the foreign object exists on an image capturing device side or on a reference member side. Further, the reference image correcting module 163 acquires a reference image to be used for correcting a document image obtained by capturing a document, and corrects the image. The foreign object determining process is described in detail below.

Next, the image generating module 164 drives the motor 314 via the motor drive circuit 315, to rotate the sheet feeding roller 113, the retard roller 114, the first conveyance roller 116, and the second conveyance roller 140 and to transfer a document (step S104).

The image generating module 164 causes the first image capturing device 133a and the second image capturing device 133b to capture respective surfaces of the transferred document to obtain document images. The reference image correcting module 163 then receives the document images from the first image capturing device 133a and the second image capturing device 133b via the first AFE 320a and the second AFE 320b (step S105).

Next, the image generating module 164 executes shading correction on the respective document images, using the respective reference images (step S106).

Next, the image generating module 164 transmits the corrected document images to the information processing device 10 via the communication IF circuit 304 (step S107).

Next, the CPU 300 determines whether a document still exists on the document tray 103, based on a first document detection signal received from the first sensor 110 (step S108).

When the document still exists on the document tray 103, the CPU 300 returns the process to the step S103, and repeats the processes of the steps S103 to S108. On the other hand, when a document does not exist on the document tray 103, the CPU 300 terminates a series of the processes.

Figure 9:
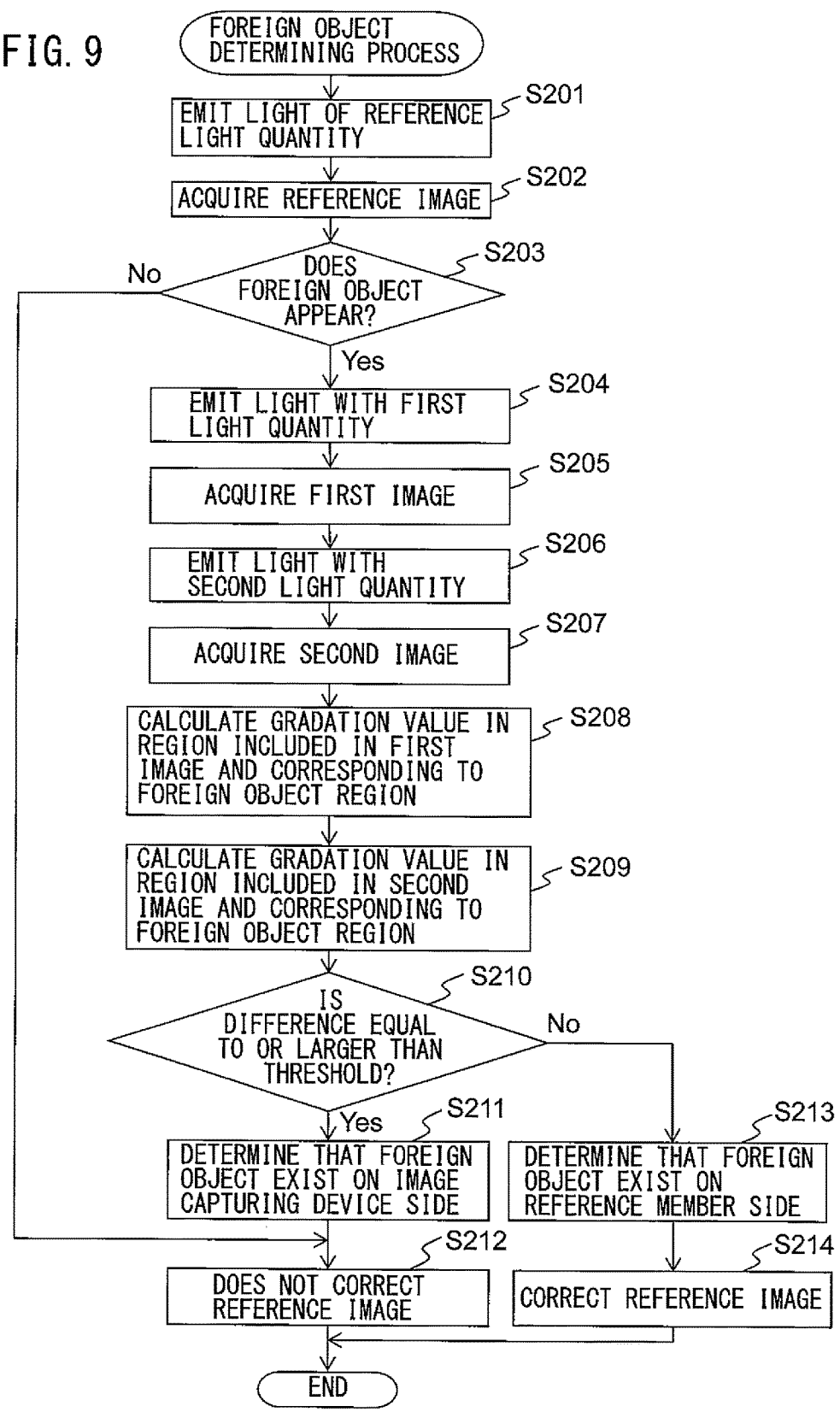
FIG. 9 is a flowchart representing an operational example of a foreign object determining process.

FIG. 9 is a flowchart representing an operational example of the foreign object determining process.

The flow illustrated in FIG. 9 is executed at the step S103 in the flowchart illustrated in FIG. 8.

First, the foreign object determining module 161 drives the light source drive circuit 310 to cause the first light source 132a and the second light source 132b to emit light with a reference light quantity (step S201). The reference light quantity is determined by foregoing experiment such that the shading correction can be appropriately performed using the captured reference images of the reference member illuminated with light with this light quantity.

Next, the foreign object determining module 161 drives the image capturing module drive circuit 311 to cause the first image capturing device 133a and the second image capturing device 133b to capture the reference images obtained by capturing the second reference member 134b and the first reference member 134a, respectively. The reference image correcting module 163 then receives the reference images from the first image capturing device 133a and the second image capturing device 133b via the first AFE 320a and the second AFE 320b (step S202). The reference image captured by the first image capturing device 133a is a captured image of the second reference member 134b under illumination of light with the reference light quantity from the first light source 132a. On the other hand, the reference image captured by the second image capturing device 133b is a captured image of the first reference member 134a under illumination of light with the reference light quantity from the second light source 132b.

Next, the foreign object determining module 161 determines whether a foreign object such as paper powder, dust, or paste appears in each of the reference images captured by the first image capturing device 133a and the second image capturing device 133b (step S203). For each of all the pixels in the reference images, for example, the foreign object determining module 161 determines whether or not the pixel has a gradation value within a predetermined range. When the pixel having gradation value outside the predetermined range exists, the foreign object determining module 161 determines that a foreign object appears in this pixel, i.e., a foreign object appears in the reference image. On the other hand, when no pixels have a gradation value outside the predetermined range, the foreign object determining module 161 determines that no foreign objects appear in the reference images.

A region where a foreign object appears in the image used by the foreign object determining module 161 for the determination, i.e., a region of pixels having gradation values outside the predetermined range is sometimes called a foreign object region in the following. The foreign object region is not limited to a region of pixels having gradation values outside the predetermined range, and may be a region whose center is a pixel (pixel whose gradation value is the peak value) having a gradation value most distant from the predetermined range and that is constituted by pixels within a predetermined distance from the pixel of this center. The predetermined range is determined, for example, to be a range that has a predetermined width (e.g., 10) and whose center is an average of gradation values of all the pixels included in the captured image of the second reference member 134b or the first reference member 134a in the foregoing experiment. Alternatively, the predetermined range may be determined to be a range that has a predetermined width and whose center is an average of gradation values of all the pixels included in the image used by the foreign object determining module 161 for the determination.

Images for determining whether or not a foreign object appears are not limited to the reference images, and may be any images so long as the images are captured by the first image capturing device 133a and the second image capturing device 133b. The foreign object determining module 161 may determine whether a foreign object appears in a first image or a second image, for example, described below.

When no foreign object appears in the reference images, the foreign object determining module 161 terminates a series of the steps without correcting the reference images.

On the other hand, when a foreign object appears in the reference image, the foreign object determining module 161 drives the light source drive circuit 310 to cause the first light source 132a and the second light source 132b to emit light with a first light quantity (step S204). The first light quantity is a light quantity different from the reference light quantity. For example, the first light quantity is set as a light quantity enabling a foreign object and the reference member to be distinguished from each other in the captured image by visual observation when the image capturing device captures the image of the foreign object and the reference member. The first light quantity may be the same as the reference light quantity.

Next, the foreign object determining module 161 drives the image capturing module drive circuit 311 to cause one or both of the first image capturing device 133a and the second image capturing device 133b to capture and acquire the first image (step S205). When a foreign object appears in the reference image captured by the first image capturing device 133a, the position determining module 162 causes the first image capturing device 133a to capture the first image. When a foreign object appears in the reference image captured by the second image capturing device 133b, the position determining module 162 causes the second image capturing device 133b to capture the first image. The first image captured by the first image capturing device 133a is a captured image of the second reference member 134b under illumination of light with the first light quantity from the first light source 132a. On the other hand, the first image captured by the second image capturing device 133b is a captured image of the first reference member 134a under illumination of light with the first light quantity from the second light source 132b.

Next, the position determining module 162 drives the light source drive circuit 310 to cause the first light source 132a and the second light source 132b to emit light with a second light quantity (step S206). The second light quantity is different from the first light quantity. For example, the second light quantity is set as a light quantity enabling a foreign object and the reference member to be distinguished from each other in the captured image by visual observation when the image capturing device captures the foreign object and the reference member. The second light quantity is larger than the first light quantity. The second light quantity may be smaller than the first light quantity.

Next, the position determining module 162 drives the image capturing module drive circuit 311 to cause one or both of the first image capturing device 133a and the second image capturing device 133b to capture and acquire the second image (step S207). When a foreign object appears in the reference image captured by the first image capturing device 133a, the position determining module 162 causes the first image capturing device 133a to capture the second image. When a foreign object appears in the reference image captured by the second image capturing device 133b, the position determining module 162 causes the second image capturing device 133b to capture the second image. The second image captured by the first image capturing device 133a is a captured image of the second reference member 134b under illumination of light with the second light quantity from the first light source 132a. On the other hand, the second image captured by the second image capturing device 133b is a captured image of the first reference member 134a under illumination of light with the second light quantity from the second light source 132b.

Next, the position determining module 162 calculates a gradation value of a region included in the first image and corresponding to the foreign object region (step S208). For example, the position determining module 162 calculates an average of gradation values of respective pixels included in the captured first image and positioned at the same coordinates as respective coordinates in the foreign object region in the reference image. The gradation value calculated by the position determining module 162 may be any representative value of gradation values in the first image, and may be a median, for example.

Next, the position determining module 162 calculates a gradation value of a region included in the second image and corresponding to the foreign object region (step S209). For example, the position determining module 162 calculates an average of gradation values of respective pixels included in the captured second image and positioned at the same coordinates as respective coordinates in the foreign object region in the reference image. The gradation value calculated by the position determining module 162 may be any representative value of gradation values in the second image, and may be a median, for example.

Next, the position determining module 162 determines whether or not an absolute value of a difference between the calculated gradation value of the region included in the first image and corresponding to the foreign object region and the gradation value of the region included in the second image and corresponding to the foreign object region is equal to or larger than a predetermined threshold (step S210). The predetermined threshold is determined, for example by foregoing experiment, to be an average of two averages, one of the two average being an average of an absolute value of a difference between the gradation values calculated when a foreign object is attached to the first glass surface 135a, the other of the two average being an average of an absolute value of a difference between the gradation values calculated when a foreign object is attached to the second glass surface 135b.

When the absolute value of the difference between the respective gradation values is equal to or larger than the predetermined threshold, the position determining module 162 determines that the foreign object exists on the image capturing device side (step S211). When the foreign object exists in the reference image captured by the first image capturing device 133a, the position determining module 162 determines that the foreign object exists on the first image capturing device 133a side, i.e., on the first glass surface 135a of the first imaging unit 130a. On the other hand, when the foreign object exists in the reference image captured by the second image capturing device 133b, the position determining module 162 determines that the foreign object exists on the second image capturing device 133b side, i.e., on the second glass surface 135b of the second imaging unit 130b.

Next, the reference image correcting module 163 terminates a series of the steps, without correcting the reference image captured by one or both of the first image capturing device 133a and the second image capturing device 133b (step S212). When the foreign object exists in the reference image captured by the first image capturing device 133a, and this foreign object exists on the first image capturing device 133a side, the reference image correcting module 163 does not correct the reference image captured by the first image capturing device 133a. When the foreign object exists in the reference image captured by the second image capturing device 133b, and this foreign object exists on the second image capturing device 133b side, the reference image correcting module 163 does not correct the reference image captured by the second image capturing device 133b.

When the foreign object exists on the image capturing device side, there is a high possibility that the foreign object appears at a position corresponding to the foreign object region in both of the reference image captured by this image capturing device and a document image subsequently captured. Thus, performing the shading correction using the reference image where the foreign object appears at the position corresponding to the foreign object region as it is enables removal of the foreign object appearing in the document image, and suppression of vertical stripe noise generation in the document image caused by the foreign object.

On the other hand, when the absolute value of the difference between the respective gradation values is smaller than the predetermined threshold, the position determining module 162 determines that the foreign object exists on the reference member side (step S213). When the foreign object exists in the reference image captured by the first image capturing device 133a, the position determining module 162 determines that the foreign object exists on the second reference member 134b side, i.e., on the second glass surface 135b of the second imaging unit 130b. On the other hand, when the foreign object exists in the reference image captured by the second image capturing device 133b, the position determining module 162 determines that the foreign object exists on the first reference member 134a side, i.e., on the first glass surface 135a of the first imaging unit 130a.

Next, the reference image correcting module 163 corrects the reference image captured by one or both of the first image capturing device 133a and the second image capturing device 133b (step S214), and terminates a series of the steps. When the foreign object exists in the reference image captured by the first image capturing device 133a, and this foreign object exists on the second reference member 134b side, the reference image correcting module 163 corrects the reference image captured by the first image capturing device 133a. When the foreign object exists in the reference image captured by the second image capturing device 133b, and this foreign object exists on the first reference member 134a side, the reference image correcting module 163 corrects the reference image captured by the second image capturing device 133b.

For example, the reference image correcting module 163 replaces each of gradation values of respective pixels included in the foreign object region in the reference image, with an average of gradation values of respective pixels included in a region neighboring this foreign object region and having a predetermined width, to thereby correct the reference image. When the foreign object exists on the reference member side facing the image capturing device, there is a high possibility that the foreign object appears in the reference image captured by this image capturing device and at the position corresponding to the foreign object region. Since a document exists between this image capturing device and the foreign object at the time of next capturing of a document image, there is a high possibility that the foreign object does not appear in the document image. Thus, the shading correction is performed using the reference image from which the foreign object has been removed. Thereby, the document image can be appropriately corrected.

At the step S210, the position determining module 162 determines whether or not the absolute value of the difference between the respective gradation values is equal to or larger than the predetermined threshold, for each of a red component, a green component, and a blue component in the first image and the second image. When the absolute value of the difference is equal to or larger than the predetermined threshold for any one of the components, the position determining module 162 determines that the foreign object exists on the image capturing device side, and when the absolute value of the difference is smaller than the predetermined threshold for all of the components, the position determining module 162 determines that the foreign object exists on the reference member side. When the absolute value of the difference is equal to or larger than the predetermined threshold for all of the components, the position determining module 162 may determine that the foreign object exists on the image capturing device side, and when the absolute value of the difference is smaller than the predetermined threshold for any one of the components, the position determining module 162 may determine that the foreign object exists on the reference member side.

At the step S214, the reference image correcting module 163 may correct the reference image for each color component. In this case, the reference image correcting module 163 corrects the color component whose absolute value of the difference between the respective gradation values is determined to be smaller than the predetermined threshold, in the reference image. Thereby, the reference image correcting module 163 can correct in the reference image the component affected by the foreign object. Accordingly, the shading correction can be performed more appropriately.

The receiving module 165 receives via the input IF circuit 316 the setting that has been set by a user via the operation button 106 and that indicates which of a single color and a plurality of colors is used to capture an image of a document. When the receiving module 165 receives the setting that indicates that a plurality of colors is used to capture an image of a document, the position determining module 162 determines whether or not the absolute value of the difference between the gradation values is equal to or larger than the predetermined threshold, for each of the red component, the green component, and the blue component. On the other hand, when the receiving module 165 receives the setting that indicates that a single color is used to capture an image of a document, the position determining module 162 may determine whether or not the absolute value of the difference between the gradation values is equal to or larger than the predetermined threshold, for one of the red component, the green component, or the blue component. In this case, when the absolute value of the difference between the gradation values is equal to or larger than the predetermined threshold for the one color component, the position determining module 162 determines that the foreign object exists on the image capturing device side, and when the absolute value of the difference is smaller than the predetermined threshold, the position determining module 162 determines that the foreign object exists on the reference member side. With these processes, a position where the foreign object exists can be accurately determined, and a process load can be reduced when a single color is used to capture an image of a document.

In this manner, the position determining module 162 determines whether a position of the foreign object is on the image capturing device side or on the reference member side, based on the absolute value of the difference between the gradation value of the region included in the first image and corresponding to the foreign object region and the gradation value of the region included in the second image and corresponding to the foreign object region.

The foreign object determining process illustrated in FIG. 9 may be performed at an arbitrary timing when the document reading process is not being performed, for example, at the timing of staring up the device, the timing of closing the opened front surface cover 105a, and the timing of starting communication connection with the information processing device 10.

The following describes the reason why comparing gradation values of two captured images of the reference member under illumination of light with different light quantities enables determination of whether a foreign object exists on the image capturing device side or on the reference member side.

A horizontal-plane illumination intensity Eh at a point on a horizontal plane given by a point light source is calculated by the following formula.

$$Eh = (I_\theta / L^2) \times \cos \theta$$

In this formula, $\theta$ is an incident angle of light to the horizontal plane, $I_\theta$ is a light quantity [cd] in the incident direction, and L is a distance [m] from the light source to the point.

In other words, the horizontal-plane illumination intensity Eh is inversely proportional to the square of the distance from the light source to the point, decreases as the distance increases, and increases as the distance decreases.

Figure 10:
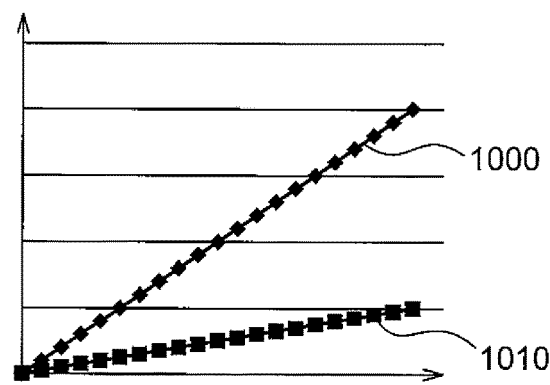
FIG. 10 is a graph expressing a relation between a light quantity of light radiated from a light source and an illumination intensity.

FIG. 10 represents a graph expressing a relation between a light quantity of light radiated from the light source and an illumination intensity.

In FIG. 10, the horizontal axis indicates a light quantity of light radiated from the light source, and the vertical axis indicates an illumination intensity. Since the relation between the first image capturing device 133a and the first light source 132a is the same as the relation between the second image capturing device 133b and the second light source 132b, the relation between the first image capturing device 133a and the first light source 132a is expressed as a representative in FIG. 10.

The graph 1000 in FIG. 10 indicates the relation between a light quantity of light radiated from the first light source 132a and an illumination intensity of a foreign object when the foreign object is attached to the first glass surface 135a (position P1 in FIG. 5) of the first imaging unit 130a. The graph 1010 indicates the relation between a light quantity of light radiated from the first light source 132a and an illumination intensity of a foreign object when the foreign object is attached to the second glass surface 135b (position P2 in FIG. 5) of the second imaging unit 130b. As illustrated in FIG. 10, an illumination intensity of the foreign object attached to the position P1 near the first light source 132a largely changes in accordance with change in a light quantity of light radiated from the first light source 132a. On the other hand, although an illumination intensity of the foreign object attached to the position P2 distant from the first light source 132a also changes in accordance with change in a light quantity of light radiated from the first light source 132a, a degree of this change is smaller than a degree of the change of an illumination intensity of the foreign object attached to the position P1.

As an illumination intensity of a foreign object increases, a gradation value of a pixel where the foreign object appears increases.

Figure 11A:
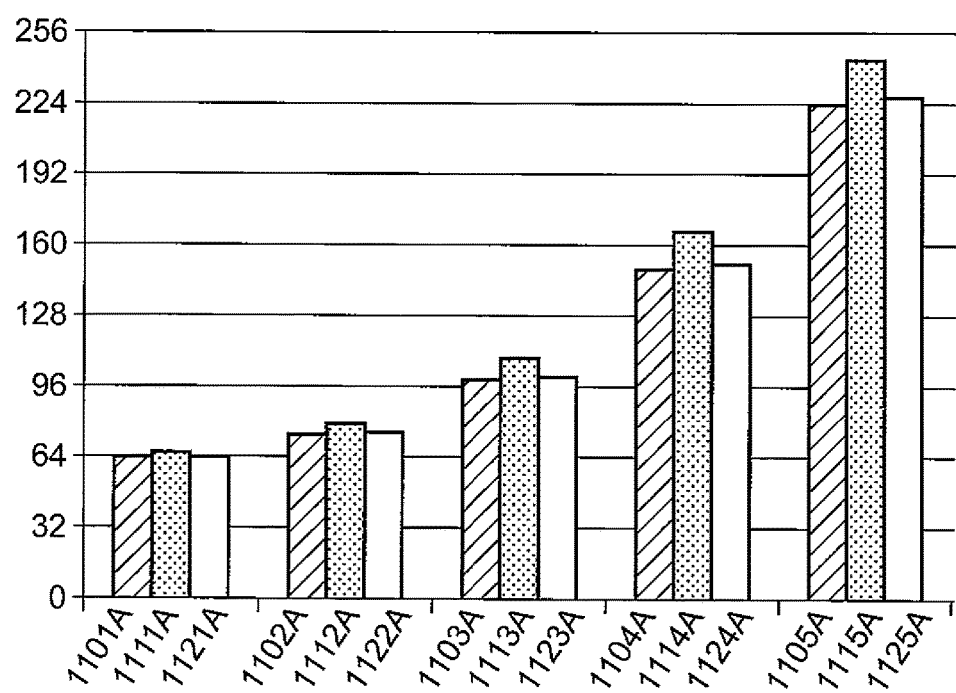
FIG. 11A is a graph expressing a relation between a light quantity of light radiated from a light source and a gradation value.

FIG. 11A, FIG. 11B, and FIG. 11C represent graphs each expressing relation between a light quantity of light radiated from a light source and a gradation value.

The vertical axes in FIG. 11A, FIG. 11B, and FIG. 11C indicate gradation values. A relation between an image captured by the first image capturing device 133a and the first light source 132a is the same as a relation between an image captured by the second image capturing device 133b and the second light source 132b. For this reason, the relation between the image captured by the first image capturing device 133a and the first light source 132a is expressed as a representative in FIG. 11A, FIG. 11B, and FIG. 11C. FIG. 11A represents a graph of red components in the images, FIG. 11B represents a graph of green components in the images, and FIG. 11C represents a graph of blue components in the images.

The graphs 1101A to 1101C, the graphs 1102A to 1102C, the graphs 1103A to 1103C, the graphs 1104A to 1104C, and the graphs 1105A to 1105C indicate gradation values of the captured pixels of the second reference member 134b to which no foreign objects are attached under illumination with light quantities that are 0.125 time, 0.25 time, 0.5 time, 1 time, and 2 times the reference light quantity, respectively. The graphs 1111A to 1111C, the graphs 1112A to 1112C, the graphs 1113A to 1113C, the graphs 1114A to 1114C, and the graphs 1115A to 1115C indicate gradation values of the captured pixels of a foreign object attached to the first glass surface 135a (P1) under illumination with light quantities that are 0.125 time, 0.25 time, 0.5 time, 1 time, and 2 times the reference light quantity, respectively. The graphs 1121A to 1121C, the graphs 1122A to 1122C, the graphs 1123A to 1123C, the graphs 1124A to 1124C, and the graphs 1125A to 1125C indicate gradation values of the captured pixels of a foreign object attached to the second glass surface 135b (22) under illumination with light quantities that are 0.125 time, 0.25 time, 0.5 time, 1 time, and 2 times the reference light quantity, respectively.

As illustrated in FIG. 11A to FIG. 11C, a gradation value of the captured pixel of the foreign object attached to the first glass surface 135a (on the image capturing device side)

largely changes in accordance with change in a light quantity. On the other hand, although a gradation value of the captured pixel of the foreign object attached to the second glass surface 135b (on the reference member side) also changes in accordance with change in a light quantity, a degree of this change is smaller than a degree of the change in a gradation value of the captured pixel of the foreign object attached to the first glass surface 135a (on the image capturing device side). Accordingly, comparing gradation values of two captured images of the reference member illuminated with light of different light quantities makes it possible to determine whether a foreign object exists on the image capturing device side or on the reference member side.

FIG. 12A to FIG. 12C and FIG. 13A to FIG. 13C represent graphs for expressing the reference image, the first image, and the second image.

In FIG. 12A to FIG. 12C and FIG. 13A to FIG. 13C, the horizontal axes indicate coordinates of the respective images in the horizontal direction, and the vertical axes indicate gradation values. The reference image, the first image, and the second image expressed by FIG. 12A to FIG. 12C and FIG. 13A to FIG. 13C are one-line images extending in the horizontal direction. Since a foreign object appears in the same manner in an image captured by either one of the first image capturing device 133a and the second image capturing device 133b, the images captured by the first image capturing device 133a are expressed as representatives in FIG. 12A to FIG. 12C and FIG. 13A to FIG. 13C.

The graph 1200 in FIG. 12A expresses one example of the captured reference image of a foreign object illuminated with the reference light quantity when the foreign object is attached to the first glass surface 135a of the first imaging unit 130a. As illustrated in FIG. 12A, in the reference image, the second reference member 134b appears in respective pixels where the foreign object does not appear. For this reason, in these pixels, the change of gradation value is small, and each gradation value stays within a predetermined range. On the other hand, in the foreign object region 1201 where the foreign object appears, the change of a gradation value is large, and each gradation value deviates from the predetermined range.

The graph 1210 in FIG. 12B expresses one example of the captured first image of a foreign object illuminated with a light quantity that is twice the reference light quantity when the foreign object is attached to the first glass surface 135a of the first imaging unit 130a. In this case, gradation values in the region 1211 included in the first image and corresponding to the foreign object region 1201 dramatically rise more than the gradation values in the foreign object region 1201 in the reference image.

The graph 1220 in FIG. 12C expresses one example of the captured second image of a foreign object illuminated with a light quantity that is 0.125 time the reference light quantity when the foreign object is attached to the first glass surface 135a of the first imaging unit 130a. In this case, gradation values in the region 1221 included in the second image and corresponding to the foreign object region 1201 dramatically falls less than the gradation values in the foreign object region 1201 in the reference image.

Figure 13A:
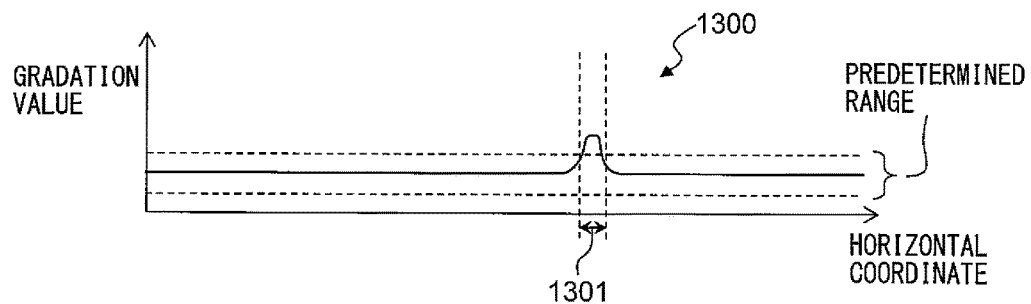
FIG. 13A is a graph for illustrating a reference image.

The graph 1300 in FIG. 13A expresses one example of the captured reference image of a foreign object illuminated with the reference light quantity when the foreign object is attached to the second glass surface 135b of the second imaging unit 130b.

Figure 13B:
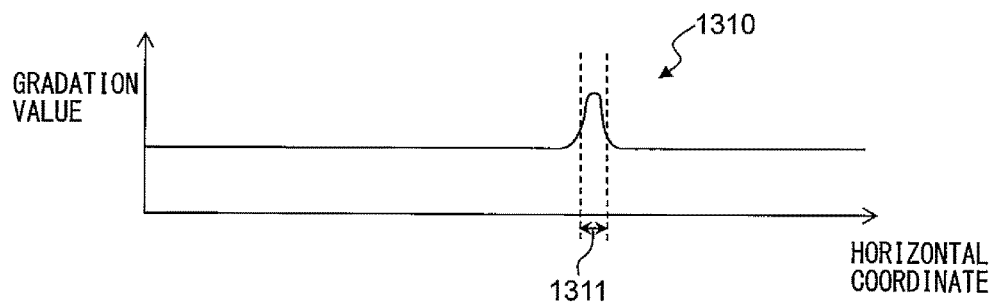
FIG. 13B is a graph for illustrating a first image.

The graph 1310 in FIG. 13B expresses one example of the captured first image of a foreign object illuminated with a light quantity that is twice the reference light quantity when the foreign object is attached to the second glass surface 135b of the second imaging unit 130b. In this case, although gradation values in the region 1311 included in the first image and corresponding to the foreign object region 1301 rise more than the gradation values in the foreign object region 1301 in the reference image, the rising degree is small.

Figure 13C:
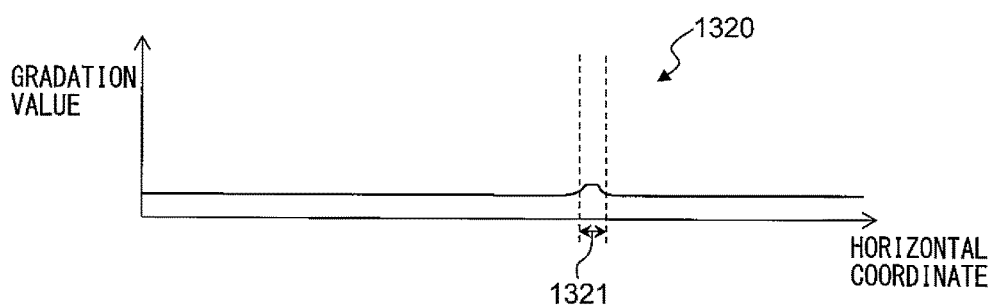
FIG. 13C is a graph for illustrating a second image.

The graph 1320 in FIG. 13C expresses one example of the captured second image of a foreign object illuminated with a light quantity that is 0.125 time the reference light quantity when the foreign object is attached to the second glass surface 135b of the second imaging unit 130b. In this case, although gradation values in the region 1321 included in the second image and corresponding to the foreign object region 1301 fall less than the gradation values in the foreign object region 1301 in the reference image, the falling degree is small.

Thus, the position determining module 162 can determine whether the foreign object exists on the image capturing device side or on the reference member side with high accuracy, by comparing gradation values included in the first image and corresponding to the foreign object region, with gradation values included in the second image and corresponding to the foreign object region.

As described in detail above, the image reading apparatus 100 operates in accordance with the flowcharts illustrated in FIG. 8 and FIG. 9, to determine an existing position of a foreign object by comparing gradation values of two captured images of the reference member under illumination of light of different light quantities. Thus, the image reading apparatus 100 can accurately determine the existing position of the foreign object. This enables the image reading apparatus 100 to appropriately determine whether or not to correct the reference image used in the shading correction, and enables the image reading apparatus 100 to generate an appropriate reference image. Therefore, the image reading apparatus 100 can suppress generation of vertical stripe noise generation in a document image caused by a foreign object.

Figure 14:
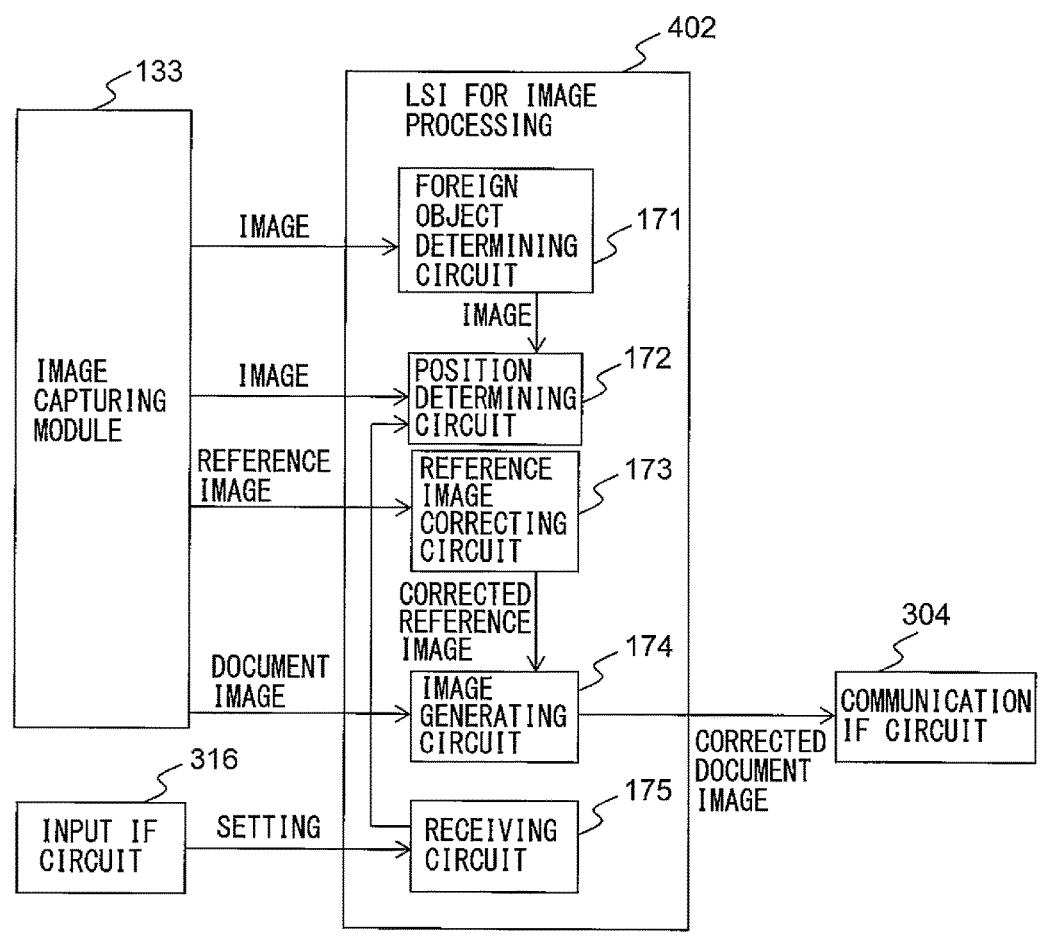
FIG. 14 is a block diagram illustrating a schematic configuration of another LSI 402 for image processing.

FIG. 14 is a block diagram illustrating a schematic configuration of an LSI 402 for image processing in an image reading apparatus according to another embodiment.

The LSI 402 for image processing is used instead of the LSI 302 for image processing in the image reading apparatus 100, and substitutes for the CPU 300 to perform the foreign object determining process and the document reading process. The LSI 402 for image processing includes a foreign object determining circuit 171, a position determining circuit 172, a reference image correcting circuit 173, an image generating circuit 174, a receiving circuit 175, and the like.

The foreign object determining circuit 171 is one example of a foreign object determining module, and has the same function as that of the foreign object determining module 161. The foreign object determining circuit 171 receives the respective images from the image capturing device 133, and determine whether or not a foreign object appears in the respective images.

The position determining circuit 172 is one example of a position determining module, and has the same function as that of the position determining module 162. When the foreign object determining circuit 171 determines that a foreign object appears in the images, the position determining circuit 172 receives the images from the image capturing device 133, and determines whether the foreign object exists on the image capturing device side or on the reference member side, based on the respective images.

The reference image correcting circuit 173 is one example of a reference image correcting module, and has the same function as that of the reference image correcting module 163. The reference image correcting circuit 173 acquires the reference image from the image capturing device 133. The reference image correcting circuit 173 does not correct the reference image when the foreign object exists on the image capturing device side, but corrects the reference image when the foreign object exists on the reference member side.

The image generating circuit 174 is one example of an image generating module, and has the same function as that of the image generating module 164. The image generating circuit 174 acquires a document image from the image capturing device 133, uses the reference image to correct the document image, and transmits the corrected document image to the information processing device 10 via the communication IF circuit 304.

The receiving circuit 175 is one example of a receiving module, and has the same function as that of the receiving module 165. The receiving circuit 175 receives from the input IF circuit 316 the setting that indicates which of a single color and a plurality of colors is used to capture an image of a document.

As described in detail above, the image reading apparatus can accurately determine an existing position of a foreign object, also in the case of using the LSI 402 for image processing.

According to the present embodiment, the image reading apparatus, the control method, and the computer-readable, non-transitory medium storing a computer program can accurately determine a position where a foreign object exists.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image reading apparatus comprising:
   an image capturing device for capturing a first image and a second image;
   a reference member provided at a position facing the image capturing device;
   a light source for emitting light to the reference member;
   a foreign object determining circuit for determining whether or not a foreign object appears in a specific image captured by the image capturing device; and
   a position determining circuit for determining whether the foreign object exists on a side of the image capturing device or on a side of the reference member, based on an absolute value of a difference between a gradation value in a region included in the first image and corresponding to a region where the foreign object appears and a gradation value in a region included in the second image and corresponding to the region where the foreign object appears when the foreign object appears in the specific image;
   wherein the first image is an image of the reference member captured under illumination of light with a first light quantity from the light source, and the second image is an image of the reference member captured under illumination of light with a second light quantity from the light source, the second light quantity being different from the first light quantity.

2. The image reading apparatus according to claim 1, wherein when the absolute value of the difference is equal to or larger than a predetermined threshold, the position determining circuit determines that the foreign object exists on the side of the image capturing device, and when the absolute value of the difference is smaller than the predetermined threshold, the position determining circuit determines that the foreign object exists on the side of the reference member.

3. The image reading apparatus according to claim 2, wherein the image capturing device further captures a reference image for correcting a document image obtained by capturing a document, and
   the image reading apparatus further comprises a reference image correcting circuit for not correcting the reference image when the foreign object exists on the side of the image capturing device, and correcting the reference image when the foreign object exists on the side of the reference member.

4. The image reading apparatus according to claim 3, wherein the position determining circuit determines whether or not the absolute value of the difference is equal to or larger than the predetermined threshold, for each of a red component, a green component, and a blue component, and
   the reference image correcting circuit corrects a color component whose absolute value of the difference is smaller than the predetermined threshold in the reference image.

5. The image reading apparatus according to claim 3, wherein the position determining circuit determines whether or not the absolute value of the difference is equal to or larger than the predetermined threshold, for each of a red component, a green component, and a blue component, and
   the reference image correcting circuit corrects the reference image only when the absolute value of the difference is smaller than the predetermined threshold for all of the components of the red component, the green component, and the blue component.

6. The image reading apparatus according to claim 3, further comprising a receiving circuit for receiving setting that indicates which of a single color and a plurality of colors is used to capture the document,
   wherein the position determining circuit determines whether the foreign object exists on the side of the image capturing device or on the side of the reference member, based on one of the red component, the green component, or the blue component when the receiving circuit receives setting that indicates that a single color is used to capture the document, and the position determining circuit determines whether the foreign object exists on the side of the image capturing device or on the side of the reference member, based on all the color components of the red component, the green component, and the blue component when the receiving circuit receives setting that indicates that a plurality of colors is used to capture the document.

7. A control method of an image reading apparatus comprising an image capturing device for capturing a first image and a second image, a reference member provided at a position facing the image capturing device, and a light source that for emitting light to the reference member; the method comprising:

determining whether or not a foreign object appears in a specific image captured by the image capturing device; and determining whether the foreign object exists on a side of the image capturing device or on a side of the reference member, based on an absolute value of a difference between a gradation value in a region included in the first image and corresponding to a region where the foreign object appears and a gradation value in a region included in the second image and corresponding to the region where the foreign object appears when the foreign object appears in the specific image;

wherein the first image is an image of the reference member captured under illumination of light with a first light quantity from the light source, and the second image is an image of the reference member captured under illumination of light with a second light quantity from the light source, the second light quantity being different from the first light quantity.

8. A computer-readable, non-transitory medium storing a computer program, wherein the computer program causes an image reading apparatus comprising an image capturing device for capturing a first image and a second image, a reference member provided at a position facing the image capturing device, and a light source for emitting light to the reference member to execute a process, the process comprising:

determining whether or not a foreign object appears in a specific image captured by the image capturing device; and determining whether the foreign object exists on a side of the image capturing device or on a side of the reference member, based on an absolute value of a difference between a gradation value in a region included in the first image and corresponding to a region where the foreign object appears and a gradation value in a region included in the second image and corresponding to the region where the foreign object appears when the foreign object appears in the specific image;

wherein the first image is an image of the reference member captured under illumination of light with a first light quantity from the light source, and the second image is an image of the reference member captured under illumination of light with a second light quantity from the light source, the second light quantity being different from the first light quantity.

\* \* \* \* \*